United States Patent
Dow et al.

(10) Patent No.: US 9,015,715 B2
(45) Date of Patent: *Apr. 21, 2015

(54) COMMON CONTIGUOUS MEMORY REGION OPTIMIZED LONG DISTANCE VIRTUAL MACHINE MIGRATION

(71) Applicant: International Business Machines Corporation, Armonk, NY (US)

(72) Inventors: Eli M. Dow, Norwood, NY (US); James P. Gilchrist, Poughkeepsie, NY (US); Steven K. Schmidt, Essex Junction, VT (US); Jessie Yu, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 13/788,428

(22) Filed: Mar. 7, 2013

(65) Prior Publication Data

US 2014/0157269 A1    Jun. 5, 2014

Related U.S. Application Data

(63) Continuation of application No. 13/690,190, filed on Nov. 30, 2012.

(51) Int. Cl.
  *G06F 9/455* (2006.01)
  *G06F 9/46* (2006.01)
  *G06F 15/173* (2006.01)

(52) U.S. Cl.
  CPC .... *G06F 9/45558* (2013.01); *G06F 2009/4557* (2013.01)

(58) Field of Classification Search
  None
  See application file for complete search history.

(56) References Cited

U.S. PATENT DOCUMENTS

| | | | |
|---|---|---|---|
| 2007/0130566 A1* | 6/2007 | van Rietschote et al. | 718/1 |
| 2008/0320122 A1* | 12/2008 | Houlihan et al. | 709/224 |
| 2010/0122052 A1* | 5/2010 | Waldspurger et al. | 711/162 |
| 2011/0145380 A1* | 6/2011 | Glikson et al. | 709/223 |
| 2012/0137285 A1* | 5/2012 | Glikson et al. | 718/1 |
| 2012/0137291 A1* | 5/2012 | Bacher et al. | 718/1 |
| 2012/0254864 A1* | 10/2012 | Bork et al. | 718/1 |
| 2012/0324073 A1* | 12/2012 | Dow et al. | 709/223 |

OTHER PUBLICATIONS

Peter Mell et al., "The NIST Definition of Cloud Computing," Version 15; p. 1-2; Oct. 7, 2009.
U.S. Appl. No. 13/690,190; Non Final Office Action; filed Nov. 30, 2012; Date Mailed: Aug. 13, 2014; 19 pages.

* cited by examiner

*Primary Examiner* — Charles Swift
(74) *Attorney, Agent, or Firm* — Cantor Colburn LLP; Steven Chiu

(57) ABSTRACT

Embodiments relate to migrating a virtual machine (VM) between work groups. A first machine in a first work group generates a migration request that identifies one or more contiguous memory regions used by the VM for operation. The first machine transmits the migration request to a plurality of work groups. The first machine receives a score from each of the plurality of work groups indicating a number of contiguous memory regions identified in the migration request that are available at the respective work group. A second work group in the plurality of work groups is identified as a destination for the VM based on the scores and a distance of the second work group from the first machine. A migration of the VM from the first machine to a second machine in the second work group is caused based on the identification of the second work group as the destination.

8 Claims, 7 Drawing Sheets

WORK GROUP B MEMORY MAP
602

| Machine No. | Region ID(s) |
|---|---|
| 522 | 1, 8 |
| 524 | 2, 3 |
| 526 | 4, 9 |
| 528 | 6, 7 |
| 530 | 2, 3, 4 |

WORK GROUP C MEMORY MAP
642

| Machine No. | Region ID(s) |
|---|---|
| 542 | 1, 3 |
| 544 | 1, 6 |
| 546 | 3, 5 |
| 548 | 6, 7 |
| 550 | 7, 8 |

WORK GROUP D MEMORY MAP
672

| Machine No. | Region ID(s) |
|---|---|
| 562 | 3, 8 |
| 564 | 2, 3, 4 |
| 566 | 1, 7 |
| 568 | 1, 9 |
| 570 | 2, 6 |

FIG. 6

COMMON CONTIGUOUS MEMORY REGION OPTIMIZED LONG DISTANCE VIRTUAL MACHINE MIGRATION

CROSS-REFERENCE TO RELATED APPLICATIONS

This application is a continuation of U.S. Non-Provisional application Ser. No. 13/690,190, entitled "COMMON CONTIGUOUS MEMORY REGION OPTIMIZED LONG DISTANCE VIRTUAL MACHINE MIGRATION", filed Nov. 30, 2012, which is incorporated herein by reference in its entirety.

BACKGROUND

The present invention relates generally to management of virtual machines (VMs), and more specifically, to a method for balancing VM loads between hardware platforms with common contiguous memory regions.

Providers of cloud computing have the competing tasks of providing desired performance for consumers or end users while also efficiently allocating the resources used to provide services to consumers. The resources may be dynamically allocated by the provider to help achieve these goals. Accordingly, a hardware platform may host a plurality of VMs, with each VM corresponding to a consumer. Efficient use of the hardware platform resources dictates that the provider place as many VMs on the platform as possible without compromising the consumer's use of the VM and experience. It may be desirable to move or migrate a VM from one hardware platform to another to ensure that the customer is not adversely affected by changes in resources for the VMs.

SUMMARY

An embodiment is directed to a method for migrating a virtual machine (VM) between work groups. The method comprises generating, by a first machine in a first work group, a migration request that identifies one or more contiguous memory regions used by the VM for operation. The method comprises transmitting, by the first machine, the migration request to a plurality of work groups. The method comprises receiving, by the first machine, a score from each of the plurality of work groups indicating a number of contiguous memory regions identified in the migration request that are available at the respective work group. The method comprises identifying a second work group in the plurality of work groups as a destination for the VM based on the scores and a distance of the second work group from the first machine. The method comprises causing a migration of the VM from the first machine to a second machine in the second work group based on the identification of the second work group as the destination.

An embodiment is directed to a system comprising a plurality of work groups each comprising a plurality of virtual machines. The plurality of work groups comprises a first work group that includes a first machine with a virtual machine (VM) to be migrated. The system is configured for generating, by the first machine, a migration request that identifies one or more contiguous memory regions used by the VM for operation. The system is configured for transmitting, by the first machine, the migration request to other work groups included in the plurality of work groups. The system is configured for receiving, by the first machine, a score from each of the other work groups indicating a number of contiguous memory regions identified in the migration request that are available at the respective work group. The system is configured for identifying a second work group in the plurality of work groups as a destination for the VM based on the scores and a distance of the second work group from the first machine. The system is configured for causing a migration of the VM from the first machine to a second machine in the second work group based on the identification of the second work group as the destination.

An embodiment is directed to a computer program product comprising a computer readable storage medium having program code embodied therewith. The program code is readable by a processor to perform a method comprising generating, by a first machine in a first work group, a migration request that identifies one or more contiguous memory regions used by a virtual machine (VM) for operation. The method comprises transmitting the migration request to a plurality of work groups. The method comprises receiving a score from each of the plurality of work groups indicating a number of regions identified in the migration request that are available at the respective work group. The method comprises identifying a second work group in the plurality of work groups as a destination for the VM based on the scores and a distance of the second work group from the first machine. The method comprises causing a migration of the VM from the first machine to a second machine in the second work group based on the identification of the second work group as the destination.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 6 illustrates a collection of exemplary memory maps in accordance with an embodiment.

DETAILED DESCRIPTION

Figure 1:
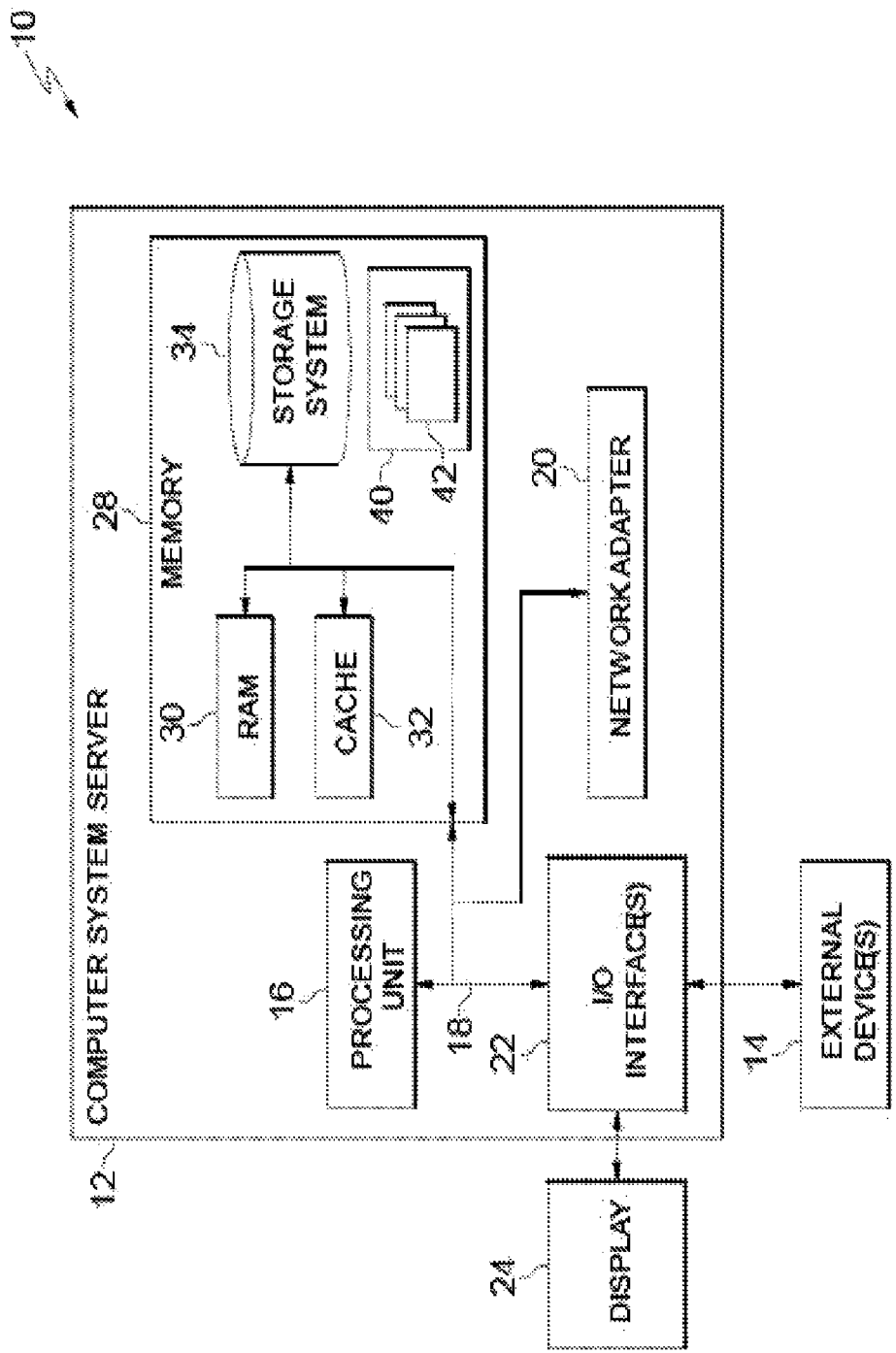
FIG. 1 depicts a cloud computing node according to an embodiment of the present invention.

Embodiments described herein are directed to machine (e.g., virtual machine (VM)) migration. In some embodiments, a migration decision or determination may be based on one or more factors, such as a distance and a memory environment of a destination machine, or work group associated with the destination machine, relative to a host machine. The one or more factors may be represented or reflected by one or more scores.

As used herein, the term "host machine" refers to a machine that wants to relieve itself of a VM due to one or more catalysts. As used herein, the term "work group" refers to those machines that are directly connected to the host machine. Machines within a work group are all directly connected to each other. As used herein, the term "peer machine" refers to any machine that is within a subject machine's work group. As used herein, the term "edge machine" refers to a machine that belongs to more than one work group.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed (e.g., any client-server model).

Cloud computing is a model of service delivery for enabling convenient, on-demand network access to a shared pool of configurable computing resources (e.g. networks, network bandwidth, servers, processing, memory, storage, applications, VMs, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
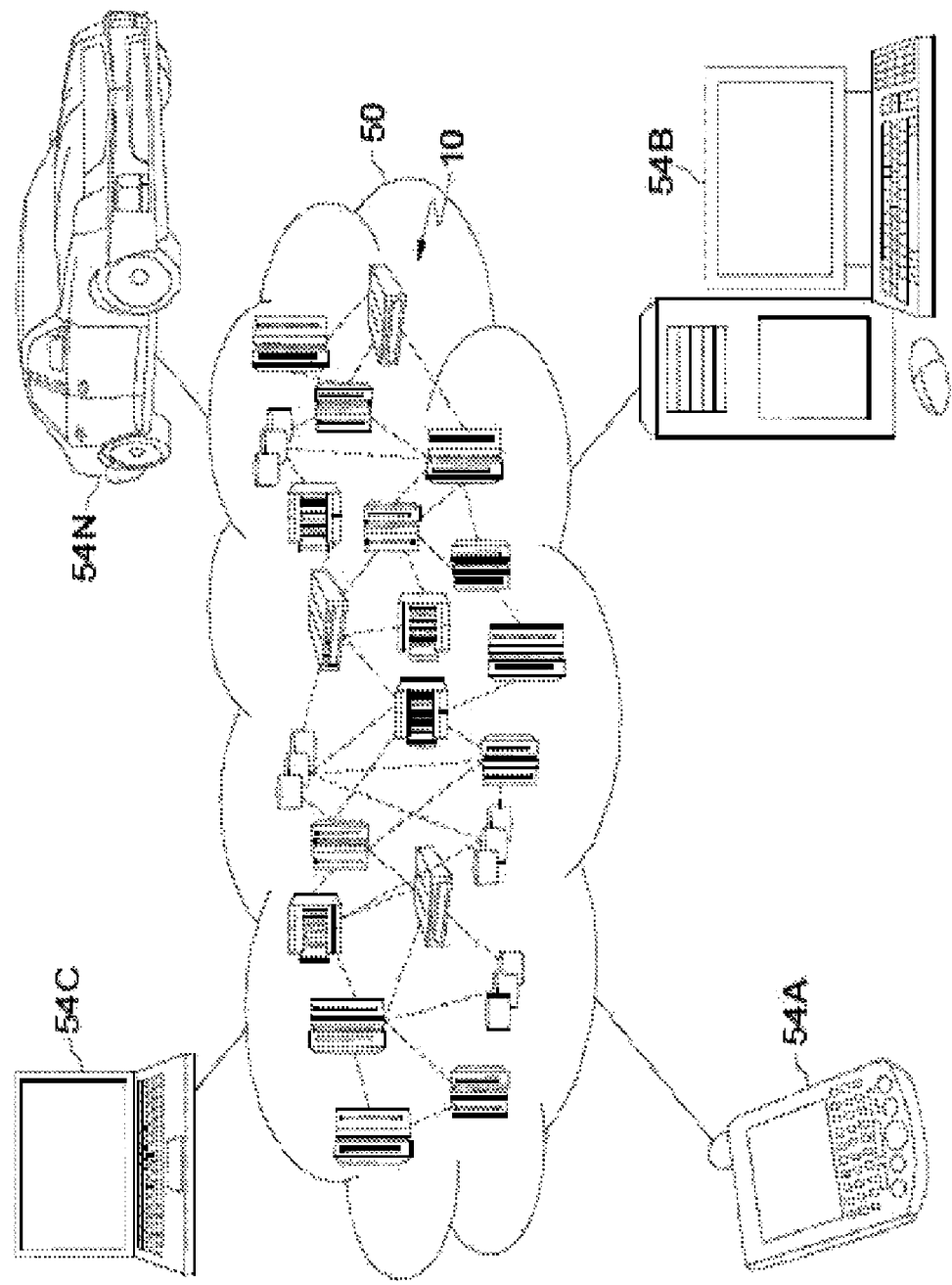
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
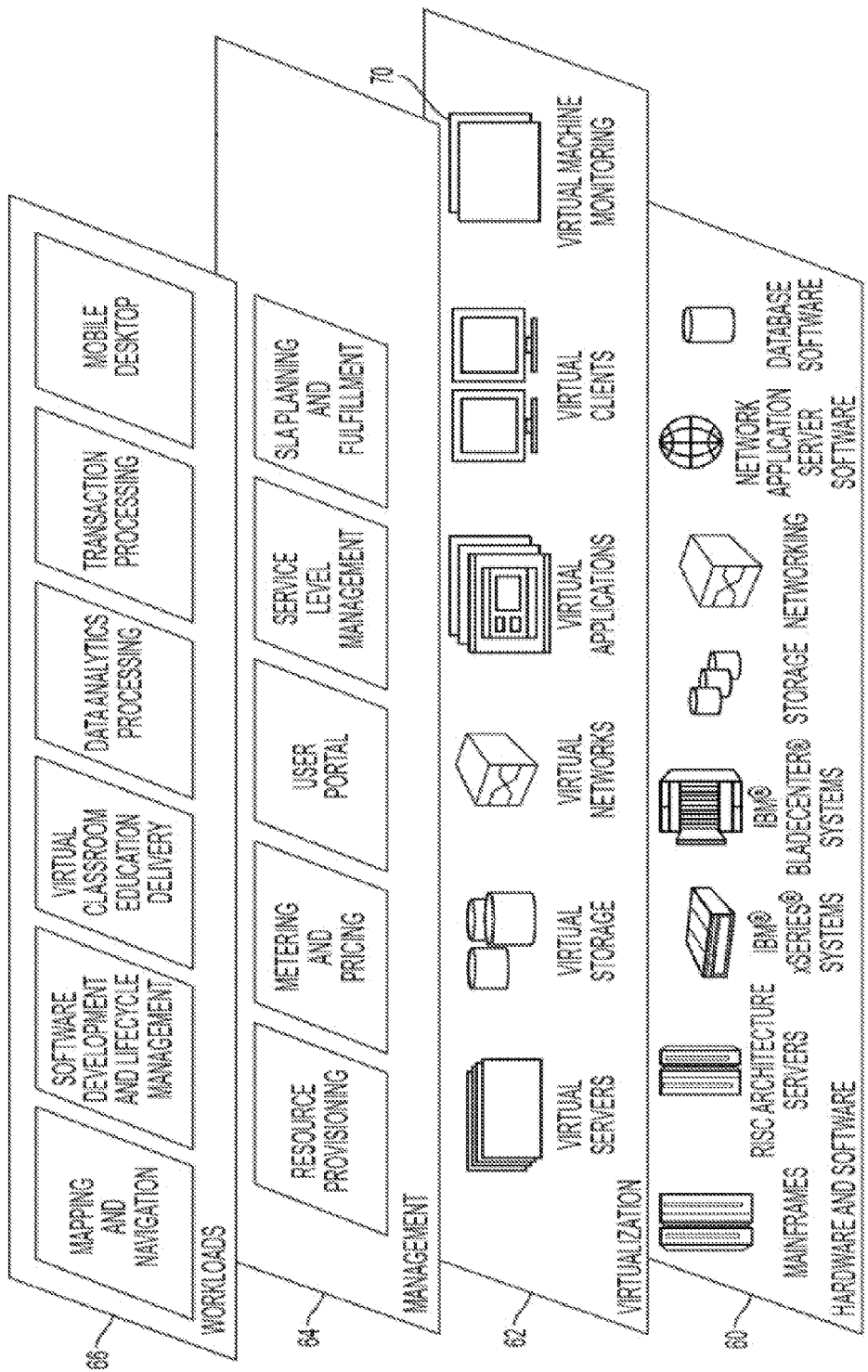
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

In one embodiment, one or both of the hardware and software layer 60 and the virtualization layer 62 may include edge components, such as a web server front end and image cache, as well as an image library store, e.g., in a high-performance RAID storage area network (SAN). In an exemplary embodiment, an application, such as a virtual machine (VM) monitoring application 70 in the virtualization layer 62, may implement a process or method for migrating a VM; however, it will be understood that the application 70 may be implemented in any layer. In some embodiments, the application 70 may migrate a VM based on a score indicative of how many common contiguous memory regions are available at a candidate destination machine or work group that are in common with common contiguous memory regions accessed by the VM. In some embodiments, the application 70 may take other factors into consideration when selecting a destination for a migrating machine.

Figure 4:
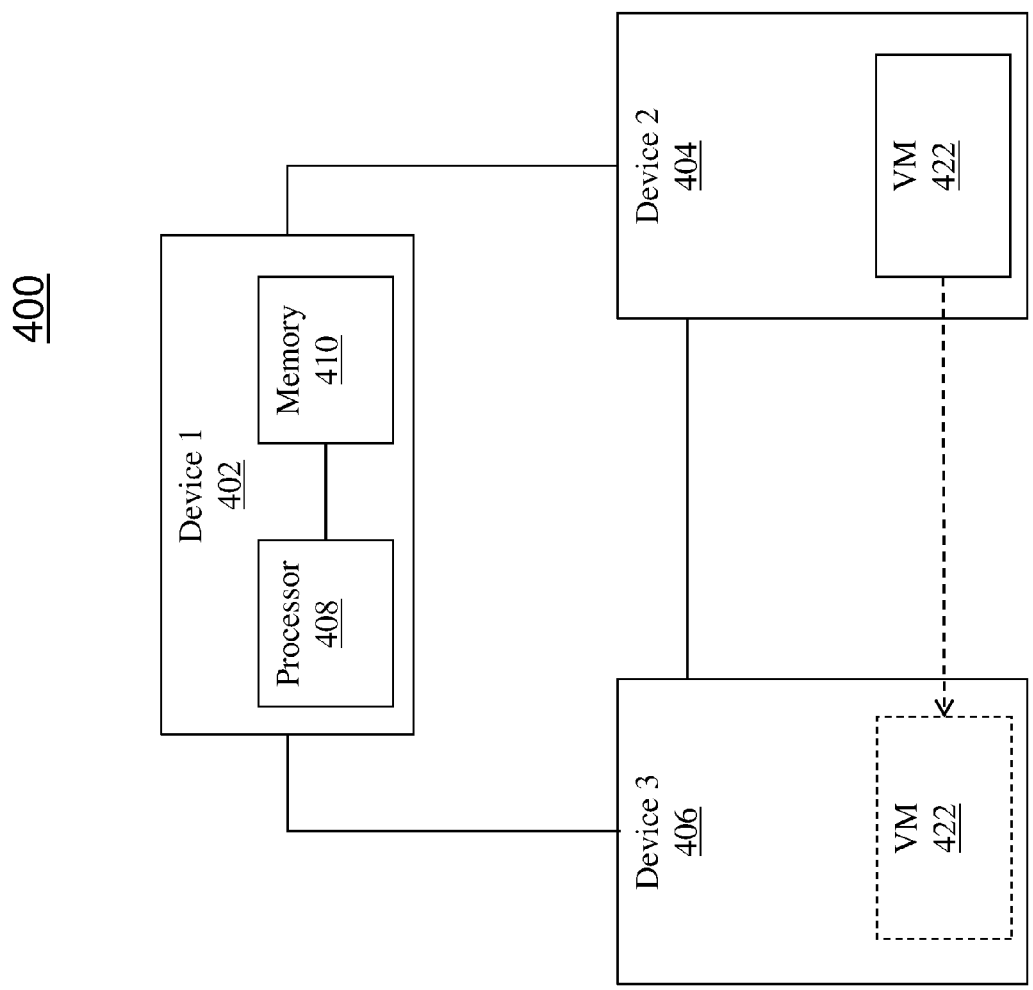
FIG. 4 illustrates an exemplary computing system associated with a work group in accordance with an embodiment.

Turning now to FIG. 4, a computing system or environment 400 in accordance with an embodiment is shown. The system 400 may be indicative of a cluster or work group.

The system 400 includes three devices, device 1 402, device 2 404, and device 3 406. The devices 402, 404, and 406 may be configured to communicate with one another. For example, the devices 402, 404, and 406 may be configured to communicate with one another over wired or wireless connections. While the system 400 is shown as including three devices, in some embodiments more or fewer than three devices may be included. In some embodiments, one or more of the devices 402, 404, and 406 may include, or be associated with, one or more of the entities described above in connection with FIG. 1.

One or more of the devices 402, 404, and 406 may include one or more components. For example, the device 402 is shown in FIG. 4 as including a processor 408 and memory 410. In some embodiments, the processor 408 may correspond to the processing unit 16 of FIG. 1. In some embodiments, the memory 410 may correspond to the memory 28 of FIG. 1. The memory 410 may be configured to store data or information. The memory 410 may have instructions stored thereon that, when executed by the processor 408, cause the device 402 to perform one or more methodological acts, such as those described herein. In some embodiments, the device 402 may include more than one processor 408. The device 402 may include additional components not shown in FIG. 4. For example, the device 402 may include a transceiver to facilitate communications with the devices 404 and 406.

In some instances, it may be desirable for one of the devices 402, 404, and 406 to relieve itself of a VM due to a catalyst. Such catalysts may include a lack of storage space on the host machine, or a decrease in overall performance due to excessive processor load, synergistic degradation of a new combination of virtual machines, planned power outages on a host, as well as disruptive software maintenance being performed on the host. In the exemplary embodiment of FIG. 4, the device 404 is shown as including a VM 422 that is migrated to the device 406. The choice to migrate the VM 422 to the device 406, as opposed to the device 402, may be based on one or more factors, such as the device 406 sharing more common contiguous memory regions with the host machine relative to the device 402.

The embodiment shown in FIG. 4 may be used to transfer or migrate a VM (e.g., VM 422) from a host machine (e.g., the device 404) to a destination machine (e.g., the device 406) within a work group (e.g., work group 400).

In some instances, it may be desirable or optimal to migrate a VM from a host machine located in a first work group to a destination machine located in a second work group. The embodiment shown in FIG. 5 illustrates such a scenario.

Figure 5:
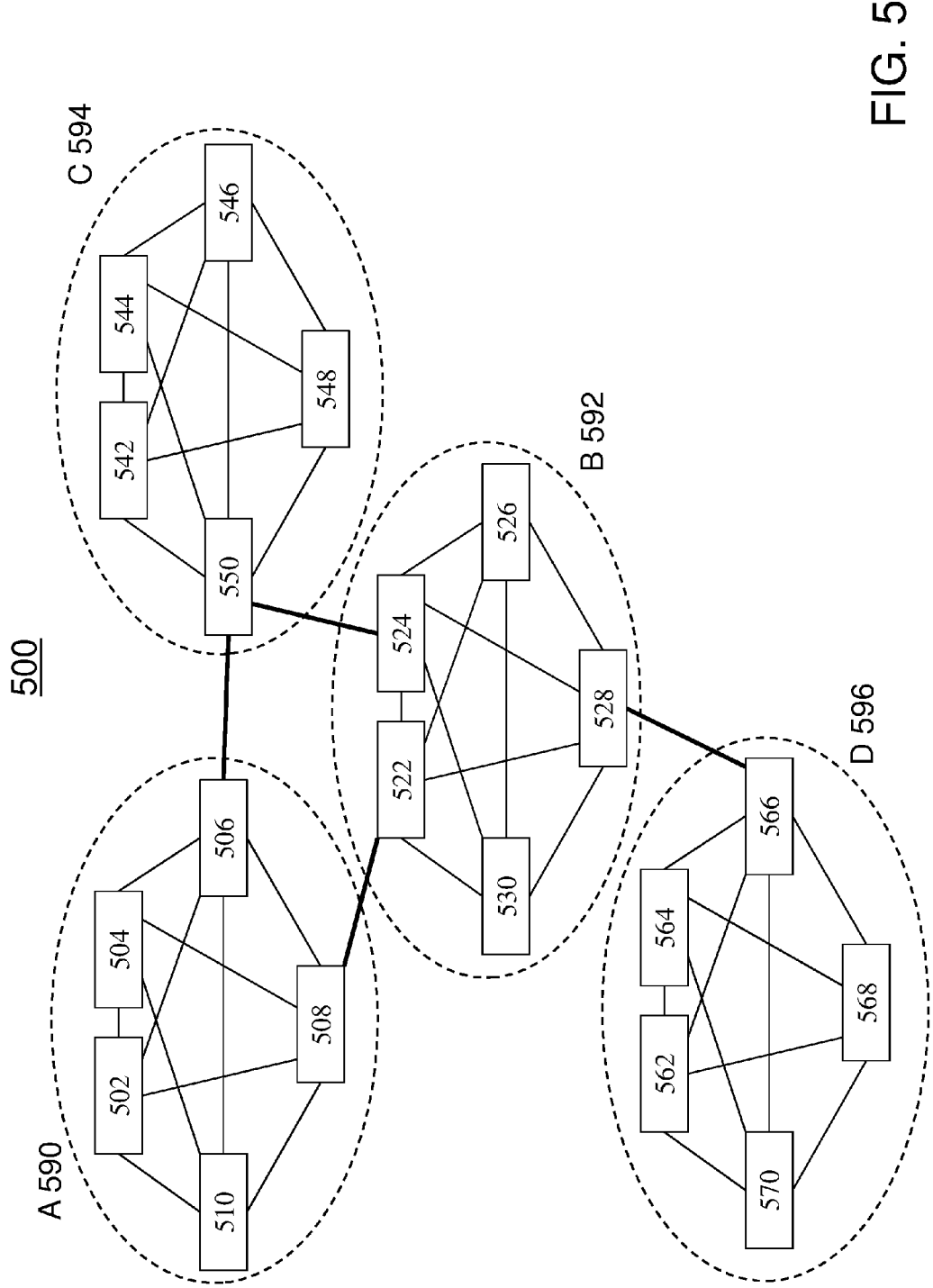
FIG. 5 illustrates an exemplary computing system associated with a plurality of work groups in accordance with an embodiment.

In FIG. 5, a computing system 500 is shown. The system 500 may include one or more components or devices, such as those described above in connection with FIGS. 1-2.

The system 500 includes a number of work groups, denoted as work groups 'A' 590, 'B' 592, 'C' 594, and 'D' 596. The work group A 590 is shown as including devices or machines 502, 504, 506, 508, and 510. The work group B 592 is shown as including devices or machines 522, 524, 526, 528, and 530. The work group C 594 is shown as including devices or machines 542, 544, 546, 548, and 550. The work group D 596 is shown as including devices or machines 562, 564, 566, 568, and 570.

While each of the work groups A 590, B 592, C 594, and D 596 is shown in FIG. 5 as including five machines, a different number of machines may be included in any given work group. Moreover, the number of machines in a work group may change over time. For example, a machine may leave a first work group to potentially join a second work group.

In some embodiments, a work group includes one or more edge machines. For example, work group A 590 includes an edge machine 506 that is coupled to work group C 594 via an edge machine 550. Work group A 590 includes an edge machine 508 that is coupled to work group B 592 via an edge machine 522. Work group B 592 includes an edge machine 524 that is coupled to work group C 594 via the edge machine 550. Work group B 592 includes an edge machine 528 that is coupled to work group D 596 via an edge machine 566.

In an exemplary scenario or use case where a VM associated with a host machine (e.g., machine 502) is to be migrated, a determination may be made to identify candidate destination machines. More specifically, a determination may be made to identify an optimal machine included in a set of candidate machines to serve as a destination machine for the VM. The determination may be based on one or more factors or scores. The factors or scores may be conveyed to, e.g., the host machine 502 via the edge machines 506, 508, 522, 524, 550, 528, and 566. In this manner, the host machine 502 may be coupled to, or indirectly connected to, all the other machines in the system 500 via the edge machines 506, 508, 522, 524, 550, 528, and 566.

In migrating a VM from the host machine 502, it may be assumed that the VM would like to have access to one or more contiguous memory regions. Such regions may be associated with the execution of the VM. The regions may be labeled or identified using one or more identifiers (e.g., alphanumeric identifiers). For purposes of illustrative simplicity, it may be assumed that the VM that is to be migrated from the host machine 502 would like to have five regions, where the first region has an identifier of '1', the second region has an identifier of '2', the third region has an identifier of '3', the fourth region has an identifier of '4', and the fifth region has an identifier of '5'.

In some embodiments, the host machine 502 transmits the identifiers '1' through '5' to the machines 504, 506, 508, and 510. Each of the machines 504, 506, 508, and 510 may compare its own stored contiguous memory regions to the identifiers to determine whether it has one or more of the corresponding regions identified by the identifiers. An intra-work group migration may take place within work group A 590 if, e.g., there are enough regions identified by one or more of identifiers '1', '2', '3', '4', and '5' present on one of the machines 504, 506, 508, or 510. An intra-work group migration may minimize distance and may avoid burdening edge machines with tasks of coordinating communication with other work groups.

In some embodiments, the identifiers '1', '2', '3', '4', and '5' are transmitted from the host machine 502 to work groups B 592, C 594, and D 596. Such transmission may occur via the edge machines 506, 508, 522, 524, 550, and 566. In response to receiving the identifiers, an edge machine may calculate a score for its respective work group. For example, the edge machine 550 may calculate a score for work group C 594, the edge machine 522 may calculate a score for work group B 592, and the edge machine 566 may calculate a score for work group D 596.

A score calculated by an edge machine may include a group score. The group score may be based on the number of contiguous memory regions available in a work group that match the identifiers transmitted by the host machine to the work group. An edge machine may calculate a group score by generating a memory map reflecting the identifiers of contiguous memory regions stored at each machine within the edge machine's respective work group as described below.

If the machine 522 has regions identified by identifiers '1' and '8', the machine 524 has regions identified by identifiers '2' and '3', the machine 526 has regions identified by identifiers '4' and '9', the machine 528 has regions identified by identifiers '6' and '7', and the machine 530 has regions identified by identifiers '2', '3' and '4', then the group score for work group B 592 may be equal to four (4), corresponding to the regions '1', '2', '3' and '4' being stored in at least one machine in work group B 592.

FIG. 6 illustrates a memory map 602 that may be generated by, e.g., the edge machine 522. The memory map 602 may reflect the identifiers associated with each of the regions that are stored at each of the machines included in work group B 592 of FIG. 5.

If the machine 542 has regions identified by identifiers '1' and '3', the machine 544 has regions identified by identifiers '1' and '6', the machine 546 has regions identified by identifiers '3' and '5', the machine 548 has regions identified by identifiers '6' and '7', and the machine 550 has regions identified by identifiers '7' and '8', then the group score for work group C 594 may be equal to three (3), corresponding to the regions '1', '3', and '5' being stored in at least one machine in work group C 594.

FIG. 6 illustrates a memory map 642 that may be generated by, e.g., the edge machine 550. The memory map 642 may reflect the identifiers associated with each of the regions that are stored at each of the machines included in work group A 594 of FIG. 5.

If the machine 562 has regions identified by identifiers '3' and '8', the machine 564 has regions identified by identifiers '2', '3', and '4', the machine 566 has regions identified by identifiers '1' and '7', the machine 568 has regions identified by identifiers '1' and '9', and the machine 570 has regions identified by identifiers '2' and '6', then the group score for the work group 592 may be equal to four (4), corresponding to the regions '1', '2', '3' and '4' being stored in at least one machine in the work group 596.

FIG. 6 illustrates a memory map 672 that may be generated by, e.g., the edge machine 566. The memory map 672 may reflect the identifiers associated with each of the regions that are stored at each of the machines included in work group D 596 of FIG. 5.

A group score for each of the groups B 592, C 594, and D 596 of FIG. 5 may be calculated by an edge machine in the respective group and returned to the host machine 502 (or another machine). The host machine 502 (or another machine) may select a work group as a destination for the migration of the VM based on the group scores.

Continuing this illustrative example, work group B 592 may be selected as a destination for the migration (assuming that a migration from the host machine 502 to another machine within work group A 590 is not possible or optimal). For example, work group B 592 may be selected relative to work group C 594 because work group B 592 may have a higher group score or better overall memory environment for the VM. Work group B 592 may be selected relative to work group D 596, despite each having a group score equal to four, because work group B 592 is closer to the host machine 502 than work group D 596 (e.g., work group B 592 is connected to work group A 590 that hosts the host machine 502, whereas work group D 596 is indirectly connected to work group A 590 via work group B 592).

When the VM of the host machine 502 is migrated to work group B 592, the edge machine 522 may be tasked with delegating the VM to a "best fit" machine within work group B 592. The machine 530 may be selected as the destination or "best fit" for the VM. The machine 530 may be selected based on having a better overall memory environment for the VM relative to any other machine in work group B 592. For example, the machine 530 may be selected based on having the highest number of regions (3, corresponding to identifiers '2', '3', and '4') that match the identifiers requested by the VM (1', '2', '3', '4', and '5'), as reflected in the memory map 602.

The machine 530 may acquire or access the region associated with identifier '1' from the machine 522, since the machine 522 has the region associated with the identifier '1' and is within the same work group as the machine 530. The machine 522 may forward the region associated with the identifier '1' to the machine 530 based on the memory map 602.

The machine 530 may acquire or access the region associated with the identifier '5' from the machine 546, potentially via coordinated efforts with one or more of the edge machines. For example, the machine 522 may know that the region associated with identifier '5' is not present on any machine in work group B 592 based on the memory map 602. Based on such knowledge, the machine 522 may transmit a request for the region associated with the identifier '5' to one or more of the edge machines (508, 524, 528) coupled to the machine 522.

If an edge machine 508, 524, 528 coupled to the machine 522 satisfies two conditions: (1) access to a memory map that (2) indicates that the region associated with the identifier '5' is included in the respective work group, then the edge machine may return such a status to the machine 522 and thereafter the region associated with the identifier '5' may be provided to the machine 522 for forwarding to the machine 530. If an edge machine fails either condition (1) or (2) above, then the edge machine may cause the request for the region to propagate to another edge machine (potentially associated with another work group) in an effort to fulfill the request.

Upon receipt of the VM from the host machine 502/work group A 590, the edge machine 522 may forward the VM to the destination machine 530. The edge machine 522 may coordinate communication within work group B 592. For example, the edge machine 522 may help the destination machine 530 retrieve necessary regions (e.g., the regions associated with identifiers '1' and/or '5') in order to bring the destination machine 530's environment as close as possible to the environment needed or requested by the VM.

In some embodiments, the generation or collection of the memory maps (e.g., memory maps 602, 642, 672) and a calculation of a group score may be shared among machines in a work group. For example, upon receiving a request from a host machine (e.g., machine 502) for a migration, the identifiers included in the request ('1', '2', '3', '4', and '5' in the foregoing example) may be circulated among the machines included in a work group. Each peer machine in the work group may indicate whether it has one or more regions associated with the request. Thus, the burden or task of generating memory maps or calculating a group score does not need to fall squarely on an edge machine in a work group. In some embodiments, one or more dedicated machines is/are provided in each work group as edge machine(s). In some embodiments, one or more dedicated machines is/are provided in a computing system or environment as edge machine(s).

Figure 7:
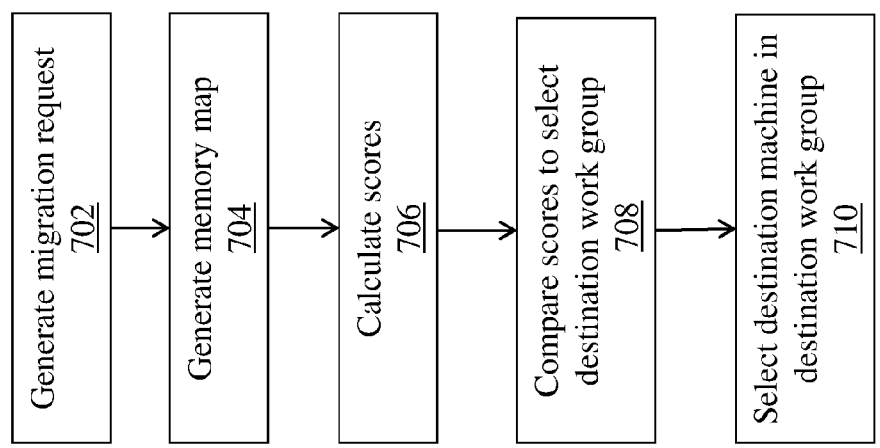
FIG. 7 illustrates a flow chart of an exemplary method in accordance with an embodiment.

Turning now to FIG. 7, a flow chart of an exemplary method 700 is shown. The method 700 may be executed in order to migrate a VM from a host machine to a destination machine. The method 700 may be operative in accordance with one or more systems, devices or machines, or components, such as those described herein. In some embodiments, the method 700 may execute in connection with the application 70 of FIG. 3.

In block 702, a request to migrate a VM from a host machine may be generated. The request may be generated in response to any number of catalysts, such as a determination that the host machine should be taken out of service, load balancing on the host machine, etc. The migration request may identify regions used by the VM for operation. As part of block 702, the migration request may be transmitted to one or more other machines. For example, the migration request may be transmitted to an edge machine associated with a work group.

In block 704, upon receipt of a migration request, an edge machine may coordinate efforts to generate a memory map for a work group. The edge machine may assemble the memory map by itself or may dictate that the memory map be assembled by circulating the memory map amongst each machine of the work group. As part of block 704, a first edge machine associated with a first work group may distribute the migration request to a second edge machine associated with a second work group.

In block 706, a score (e.g., a group score) may be calculated based on the memory map of block 704 and the regions identified in the migration request of block 702. The score may reflect the number of regions in common between the memory map and the migration request in a given work group. In block 706, a score may be calculated for each work group.

In block 708, the scores for the work groups may be collected and compared. A destination work group may be selected based on the scores. For example, a destination work group may be selected based on having the highest score. In the event of a tie, the destination work group may be selected based on being the shortest distance from the host machine. In some embodiments, the destination work group may be selected based on a time it would take to migrate the VM to the destination work group. For example, the destination work group may be selected based on having the lowest time to migrate the VM relative to other candidate work groups. The time to migrate the VM may be a function of a link speed or throughput coupling a source work group and a destination work group.

In block 710, a destination machine included in the destination work group of block 708 may be selected. The destination machine may be selected based on the memory map of block 704. An edge machine may be responsible for selecting or delegating the VM to the destination machine, coordinating access by the destination machine or VM to one or more regions, etc.

The destination machine may be selected based on having the greatest aggregate shared contiguous memory regions with respect to the migrating VM or guest, or the greatest sum of all common contiguous memory regions in bytes (or some other unit for the amount of memory in common). For example, if a first candidate destination machine has one hundred (100) contiguous memory regions of one (1) byte each in common with the migrating VM, and a second candidate destination machine has ten (10) contiguous memory regions of one hundred (100) bytes each in common with the migrating VM, then technically speaking the "most contiguous memory regions" in common with the migrating VM would be the one-hundred regions of one byte each. However, one skilled in the art would appreciate that ten regions of one-hundred bytes each would yield more memory replication. As such, in this example the second candidate destination machine may be selected as the destination machine in order to reduce or minimize duplication efforts. More generally, a destination machine in a destination work group may be selected based on a determination that the destination machine has available the most contiguous memory identified in a migration request relative to one or more other machines in the destination work group.

The method 700 is illustrative. In some embodiments, one or more of the blocks (or a portion thereof) may be optional. In some embodiments, the blocks may execute in an order or sequence that is different from what is shown in FIG. 7. In some embodiments, one or more additional blocks not shown may be included.

As described herein, migration of a VM from a host machine to a destination machine may be based on a number of regions in common between the host and the destination and a distance between the host and the destination. Other factors, taken alone or in any combination with one another, may be taken into consideration when selecting the destination from a set of candidate destinations. For example, the size of the memory pages or regions used by a VM, an executable load imposed on each of the candidate destinations, processing resources available on each of the candidate destinations, etc., may be taken into consideration when selecting a destination machine from a set of candidate destination machines.

In some embodiments, the factors may be weighted relative to one another in order to place a particular level of emphasis on a given factor relative to the other factors. For example, an activity level of a VM may be used to determine a tolerable distance to migrate the VM. Thus, a first VM that is deemed to be idle relative to some threshold might be migrated a larger distance (e.g., a greater number of network hops) relative to a second VM that is more active. The function performed by the VM may also be taken into consideration when determining a tolerable distance. For example, if a VM performs a critical function (e.g., support for emergency telecommunications), the distance of tolerable migration may be small relative to a second VM that performs a less critical function (e.g., selects colors for logos used on web pages).

In some embodiments, a distance or number of hops associated with a migrating VM may be reduced or eliminated. For example, in some embodiments a virtual private network (VPN) or tunnel may be established to avoid an excessive number of hops in migrating a VM. In this manner, a longer migratory distance can effectively be short-circuited in order to minimize the time a VM is offline or in order to enhance throughput.

Technical effects and benefits include increasing or enhancing performance by decreasing an amount of information or data that needs to be transmitted during a migration. Startup time on a destination machine may be reduced or minimized relative to conventional solutions. A reduction in a number of misses when attempting to access memory may be realized. A VM may be migrated to an optimal host machine, which may provide for an optimal use of limited computing resources.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for migrating a virtual machine (VM) between work groups, the method comprising:
    generating, by a first machine, a migration request that identifies one or more contiguous memory regions used by the VM for operation;
    transmitting, by the first machine, the migration request to other work groups included in the plurality of work groups;
    receiving, by the first machine, a score from each of the other work groups indicating a number of contiguous memory regions identified in the migration request that are available at the respective work group;
    comparing the scores received from the other work groups and selecting one of the work groups having the most contiguous memory regions available, as compared to others of the work groups, as a destination;
    upon determining a tie in the scores of two or more of the work groups, selecting, as the destination for the VM, the work group having a shortest distance to the first machine; and
    causing a migration of the VM from the first machine to a second machine in the selected work group based on the identification of the selected work group as the destination.

2. The method of claim 1, wherein the first machine is a first edge machine and the second machine is a second edge machine.

3. The method of claim 2, wherein the causing of a migration from the first machine to the second machine is based on the second edge machine determining that the second machine has available the most contiguous memory identified in the migration request in the selected work group.

4. The method of claim 1, wherein the transmitting is to a second edge machine included in the selected work group, and a first edge machine in the first work group receives the score for the selected work group from the second edge machine.

5. The method of claim 1, further comprising:
    identifying the selected work group as the destination for the VM based on a weighting of each of the scores relative to the distances of each work group included in the plurality of work groups.

6. The method of claim 1, further comprising:
    identifying the selected work group as the destination for the VM based on an activity level associated with the VM.

7. The method of claim 1, further comprising:
    using at least one of a virtual private network (VPN) and a tunnel to migrate the VM from the first machine to the second machine in order to minimize a number of hops.

8. The method of claim 1, wherein at least one of the first machine and the second machine operate in a cloud computing network.

* * * * *